United States Patent
Ranganathan (10) Patent No.: US 8,442,309 B2
(45) Date of Patent: May 14, 2013

(54) SEMANTIC SCENE SEGMENTATION USING RANDOM MULTINOMIAL LOGIT (RML)

(75) Inventor: Ananth Ranganathan, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 12/789,292

(22) Filed: May 27, 2010

(65) Prior Publication Data

US 2010/0310159 A1    Dec. 9, 2010

Related U.S. Application Data

(60) Provisional application No. 61/217,930, filed on Jun. 4, 2009.

(51) Int. Cl.
*G06K 9/00* (2006.01)

(52) U.S. Cl.
USPC ........... 382/159; 382/155; 382/199; 382/285; 77/999.005

(58) Field of Classification Search ................... 382/199, 382/285, 159, 155
See application file for complete search history.

(56) References Cited

U.S. PATENT DOCUMENTS

| | | | |
|---|---|---|---|
| 4,945,478 A | 7/1990 | Merickel et al. | |
| 6,205,247 B1 | 3/2001 | Breuer et al. | |
| 7,082,181 B2 * | 7/2006 | Nishide et al. | 378/4 |
| 7,110,000 B2 * | 9/2006 | Zhang et al. | 345/582 |
| 7,162,055 B2 | 1/2007 | Gu et al. | |
| 7,295,870 B2 * | 11/2007 | Allain et al. | 600/425 |
| 7,688,363 B2 * | 3/2010 | Sato et al. | 348/240.2 |
| 2004/0120572 A1 * | 6/2004 | Luo et al. | 382/159 |
| 2004/0252870 A1 | 12/2004 | Reeves et al. | |
| 2005/0015376 A1 | 1/2005 | Fraser et al. | |
| 2005/0221266 A1 * | 10/2005 | Mislevy et al. | 434/322 |
| 2008/0027917 A1 | 1/2008 | Mukherjee et al. | |
| 2008/0075361 A1 * | 3/2008 | Winn et al. | 382/155 |
| 2009/0083790 A1 | 3/2009 | Wang et al. | |
| 2009/0299999 A1 * | 12/2009 | Loui et al. | 707/5 |

OTHER PUBLICATIONS

Bosch, A. et al., "Image Classification using Random Forests and Ferns," *International Conference on Computer Vision*, 2007, eight pages.

Geurts, P. et al., "Extremely Randomized Trees," *Machine Learning*, Mar. 2, 2006, forty pages.

(Continued)

*Primary Examiner* — Hadi Akhavannik
(74) *Attorney, Agent, or Firm* — Fenwick & West LLP; Mark E. Duell (57) ABSTRACT

A system and method are disclosed for learning a random multinomial logit (RML) classifier and applying the RML classifier for scene segmentation. The system includes an image textonization module, a feature selection module and a RML classifier. The image textonization module is configured to receive an image training set with the objects of the images being pre-labeled. The image textonization module is further configured to generate corresponding texton images from the image training set. The feature selection module is configured to randomly select one or more texture-layout features from the texton images. The RML classifier comprises multiple multinomial logistic regression models. The RML classifier is configured to learn each multinomial logistic regression model using the selected texture-layout features. The RML classifier is further configured to apply the learned regression models to an input image for scene segmentation.

26 Claims, 8 Drawing Sheets
(2 of 8 Drawing Sheet(s) Filed in Color)

OTHER PUBLICATIONS

PCT International Search Report and Written Opinion, PCT Application No. PCT/US2010/036656, Jul. 21, 2010, six pages.

Prinzie, A. et al., "Random Multiclass Classification: Generalizing Random Forests to Random MNL and Random NB," Jun. 2007, Ghent University, Ghent, Belgium, twelve pages.

Vogel, J. et al., Categorization of Natural Scenes: Local versus Global Information and the Role of Color, *ACM Transactions on Applied Perception*, Nov. 2007, vol. 4, No. 3, Article 19, 21 pages.

Zhang, J. et al., "Local Features and Kernels for Classification of Texture and Object Categories: A Comprehensive Study," *International Journal of Computer Vision*, 2006, twenty-six pages.

\* cited by examiner

SEMANTIC SCENE SEGMENTATION USING RANDOM MULTINOMIAL LOGIT (RML)

CROSS REFERENCE TO RELATED APPLICATIONS

This application claims the benefit of U.S. Provisional Application No. 61/217,930, filed Jun. 4, 2009, entitled "Semantic Scene Segmentation Using Random Multinomial Logit," which is incorporated by reference in its entirety.

FIELD OF THE INVENTION

The present invention relates generally to scene segmentation in image processing systems, and in particular to semantic scene segmentation using multinomial logistic regression models.

BACKGROUND OF THE INVENTION

In computer image analysis such as intelligent transportation systems, a common task is to classify street scenes in a captured image. This task often involves detecting road, other vehicles and pedestrians to alert a user of the intelligent transportation system in potentially dangerous situations. Detection of objects of interest in a captured image generally requires segmenting the image into regions of interest and/or further segmenting the regions of interest into objects of interest.

Scene segmentation has been an active area of research and has a wide range of applications to real world problems, such as applications in robotics and automotive systems. One conventional scene segmentation method employs discretized representations, such as codebooks of features or texton images, which model a whole image or specific regions of the image with or without spatial context of the image. Textons of an input image are discretized texture words, which are learned by applying a filter bank to the input image and clustering the output of the filter bank. The problem with this method is that it can only address scene segmentation at image level. Thus, it face challenges of detecting and localizing objects especially small size objects in an image, where image level features and statistics are often insufficient.

Another conventional scene segmentation method uses texture-layout features of an input image to boost feature selections that act on textons. An example of this conventional scene segmentation method uses a semantic texton forest for both textons creation and for textons classification. Since the number of such features is very large, training a scene segmentation engine used in this method is very slow and the performance of such scene segmentation deteriorates with the increasing size of training dataset and variation in object classes in the training dataset.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

DETAILED DESCRIPTION OF THE INVENTION

An embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Embodiments of the invention provide learning a random multinomial logit (RML) classifier for scene segmentation and applying the learned RML classifier to an input image for scene segmentation. A scene segmentation system using the RML classifier learns the RML classifier though a pre-labeled image training set and improves the performance of the RML classifier for scene segmentation by randomly selected texture-layout features. The scene segmentation system pre-processes the image training set by removing contrast and brightness variations among the images in the image training set, and by convoluting and clustering the images in the image training set. The system replaces the features used by the RML classifier with randomly selects texture-layout features based on a statistical significance measurement associated with the features. Each multinomial logistic regression model of the RML classifier estimates the probability distribution of a texton word of a selected texture-layout feature. The system generates a final label for the texton word by averaging the probability distribution of each multinomial logistic regression model of the RML classifier. The learned RML classifier can be applied to an input image for scene segmentation. The disclosed scene segmentation system also has a wide range application to real world problems, such as applications in robotics and automotive systems.

One embodiment of a disclosed system (and method) includes learning a random multinomial logit (RML) classifier and applying the RML classifier for scene segmentation. The system includes an image textonization module, a feature selection module and a RML classifier. The image textonization module is configured to receive an image training set with the objects of the images being pre-labeled. The image textonization module is further configured to generate corresponding texton images from the image training set. The feature selection module is configured to randomly select one or more texture-layout features from the texton images. The RML classifier comprises multiple multinomial logistic regression models. The RML classifier is configured to learn each multinomial logistic regression model using the selected texture-layout features. The RML classifier is further configured to apply the learned regression models to an input image for scene segmentation.

System Overview

Figure 1:
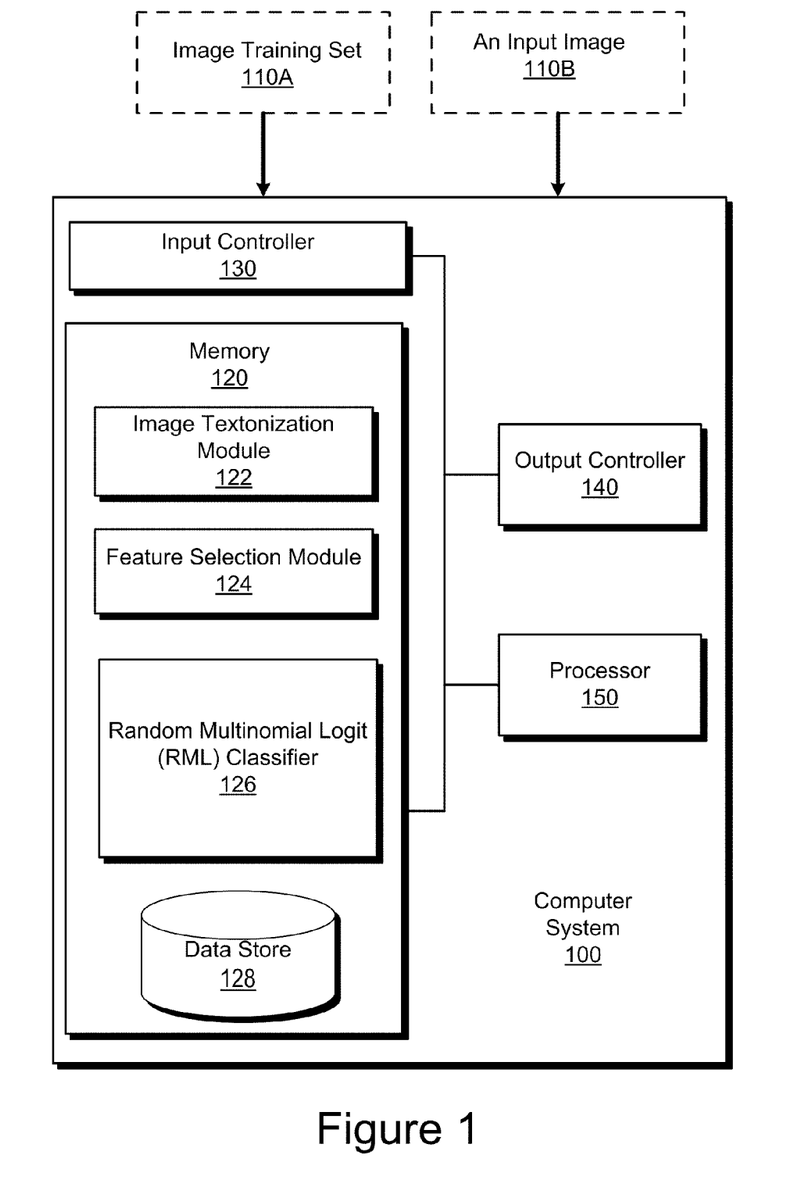
FIG. 1 illustrates a computer system for semantic scene segmentation using a random multinomial logit classifier according to one embodiment of the invention.

FIG. 1 illustrates a computer system 100 for semantic scene segmentation using a random multinomial logit (RML) classifier 126 according to one embodiment of the invention. The computer system 100 comprises a memory 120, an input controller 130, an output controller 140 and a processor 150. In one embodiment, the computer system 100 is configured to receive an image training set 110A to learn the RML classifier 126. In another embodiment, the computer system 100 is configured to receive an input image 110B for scene segmentation by the learned RML classifier 126. The image training set 110A comprises multiple pre-labeled images. The input image 1008 is any still image or a frame of a video received by the computer system 100 for scene segmentation. Learning the RML classifier 126 using the image training set 110A is further described below with reference to FIG. 2. Applying the RML classifier 126 to the input image 110B is further described below with reference to FIG. 6.

In one embodiment, the image training set 110A comprises video sequences obtained by mounting a camera on a moving vehicle capturing motorbikes on streets. The videos are similar to what a driver would see in a side rearview mirror of a moving vehicle. The videos can differ in the types of motorbikes captured, viewing perspectives and the amount of clutter and lighting quality. For example, one image training set 116A contains sixty-three frames selected from six video sequences with approximately 5,800 frames in total. The selected frames are labeled according to the type of the objects they represent, such as bike, road, sky and others. The pre-labeled image training set 110A is received by the computer system 100 to learn the RML classifier 126. The learning results of the RML classier 126 are compared with the labels of the image training set 110A for evaluating the performance of the RML classifier 126.

The memory 120 stores data and/or instructions that may be executed by the processor 150. The instructions may comprise code for performing any and/or all of the techniques described herein. Memory 120 may be a DRAM device, a static random access memory (SRAM), Flash RAM (non-volatile storage), combinations of the above, or some other memory device known in the art. In one embodiment, the memory 120 comprises an image textonization module 122, a feature selection module 124, the RML classifier 126 and a data store 128.

The image textonization module 122 comprises computer executable instructions for generating corresponding texton images from input images. A texton image generated from an input image is an image of pixels, where each pixel value in the texton image is a representation of its corresponding pixel value in the input image. Specifically, each pixel value of the input image is replaced by a representation e.g., a cluster identification, corresponding to the pixel value of the input image after the input image being processed. For example, an input image is convoluted with a filter bank resulting in 17-degree vectors for each pixel of the input images. The 17-degree vectors of the input image after filtering are clustered and each of the 17-degree vectors is represented by an identification of the cluster (e.g., the cluster number) to which the vector belongs. A texton image is obtained in response to each pixel value of the input image being replaced by its corresponding cluster identification. Each pixel of a texton image is a texton word, which is also referred to as a texture cluster. The image textonization module 122 is further described below with reference to FIG. 4.

The feature selection module 124 comprises computer executable instructions for carrying out random texture-layout feature selection described below with reference to FIGS. 5A and 5B. A texture-layout feature is a selected portion of a texton image, e.g., a selected rectangle region of the texton image. For each selected texture-layout feature, the feature selection module 124 computes a percentage of pixels whose pixel value is equal to the cluster identification of a specified texture cluster. The RML classifier 126 comprises computer executable instructions for learning and applying multiple multinomial logistic regression models of the RML classifier 126 described below with reference to FIGS. 2, 3A and 3B. The data store 128 stores the RML classifier 126 learning results and/or semantic segmentation results in one embodiment of the invention.

Figure 2:
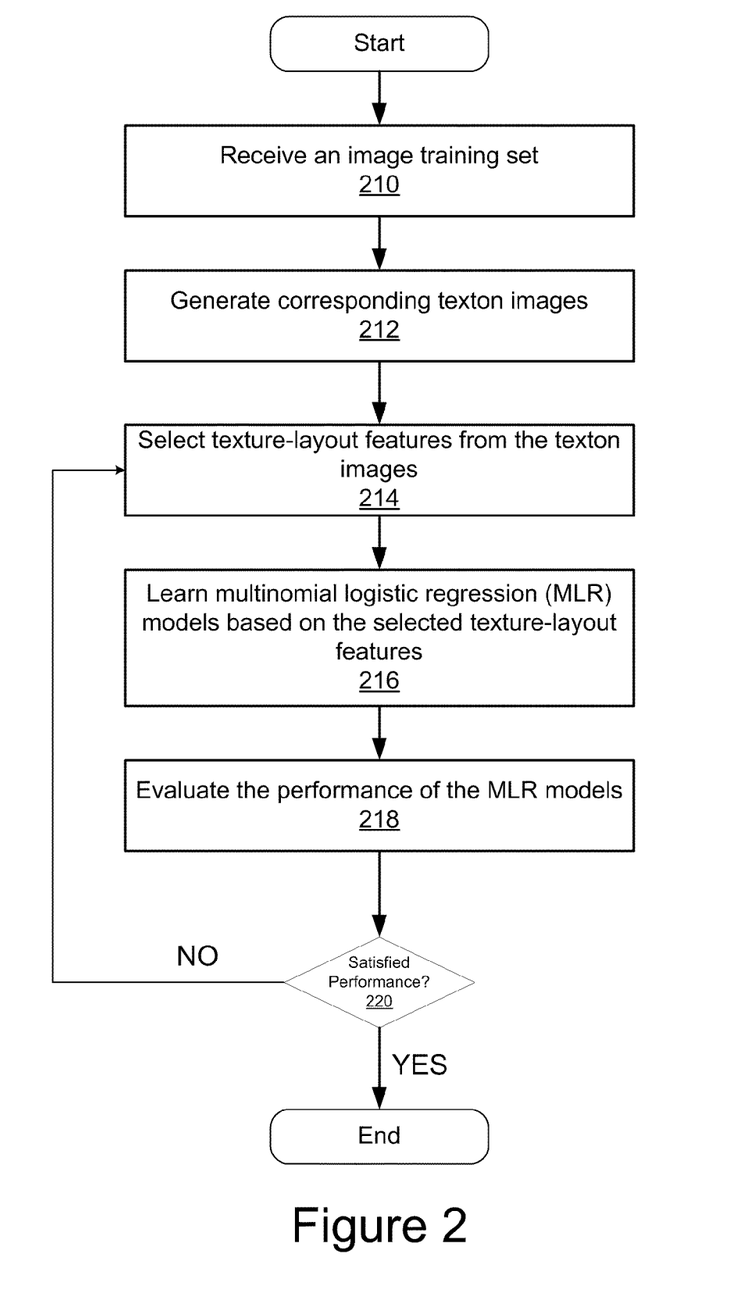
FIG. 2 is a flowchart of learning multinomial logistic regression models of the random multinomial logit classifier according to one embodiment of the invention.

FIG. 2 is a flowchart of learning multinomial logistic regression models of the random multinomial logit classifier 126 according to one embodiment of the invention. Initially, the computer system 100 receives 210 an image training set containing multiple images, where each of the images is labeled according to the type of the objects they represent in the image, such as bike, road, sky and others. The image textonization module 122 generates the corresponding texton images from the images in the training set. The feature selection module 124 randomly selects 214 texture-layout features from the texton images and sends the selected features to the RML classifier 126. Each of the multinomial logistic regression models of the RML classifier 126 models 216 the probability distribution of a given texture word in a selected feature of a texton image. The RML classifier 126 evaluates 218 the performance of the multinomial logistic regression models. In response to satisfactory performance of the multinomial logistic regression models, the RML classifier 126 ends 220 the learning process; otherwise, the RML classifier 126 repeats the learning process with newly selected texture-layout features from the texton images.

Figure 3A:
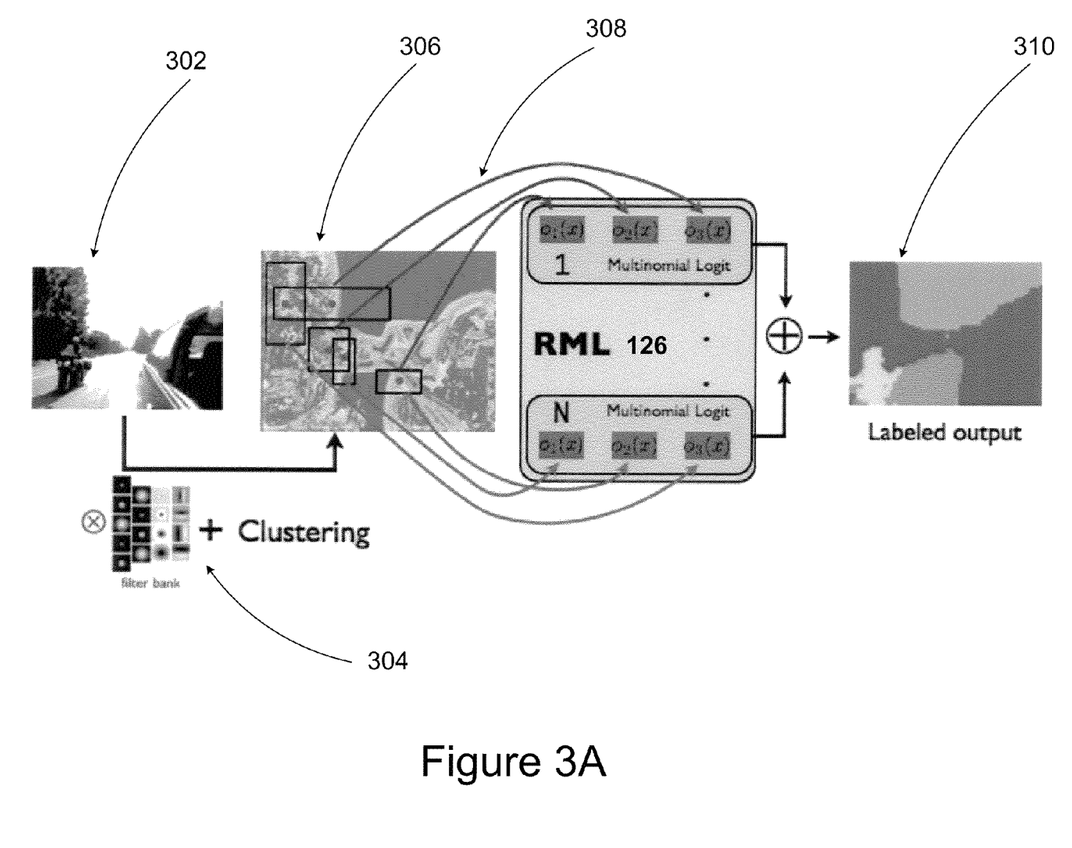
FIG. 3A is an illustration in black and white of semantic scene segmentation according to one embodiment of the invention.
Figure 3B:
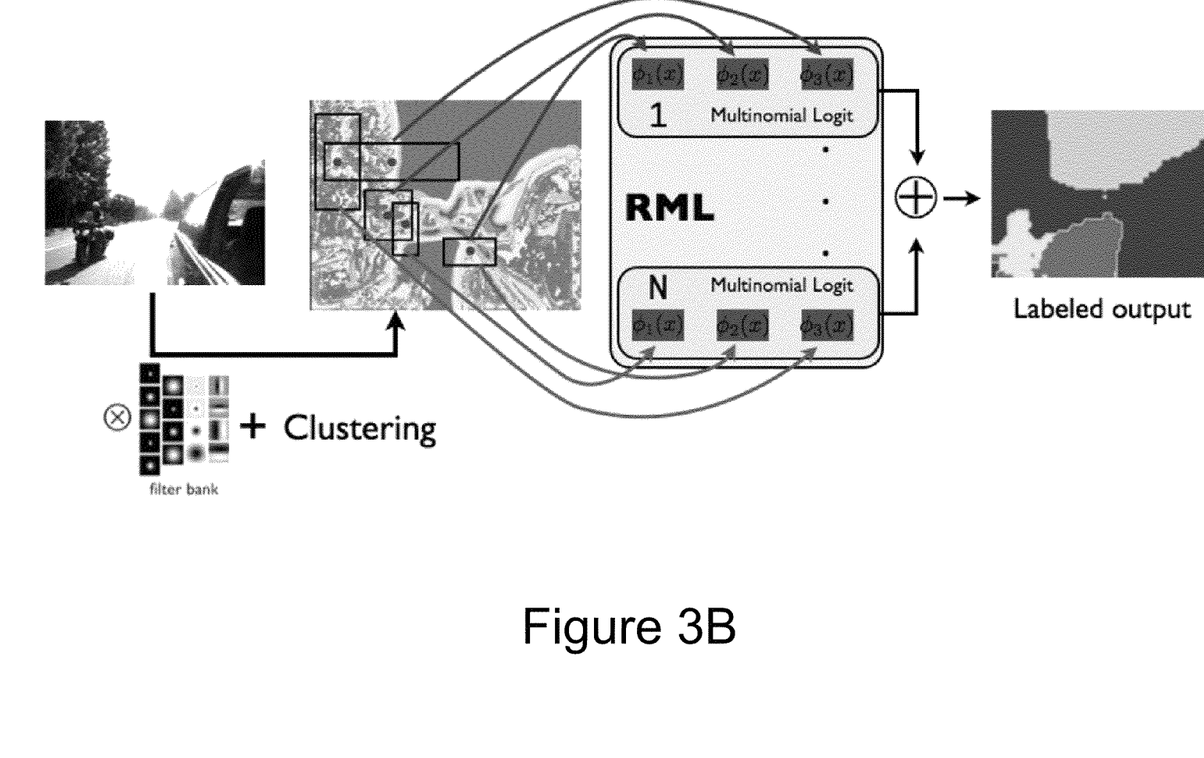
FIG. 3B is a corresponding illustration in color of FIG. 3A of semantic scene segmentation according to one embodiment of the invention.

FIG. 3A is an illustration in black and white of semantic scene segmentation according to one embodiment of the invention. Initially, an image training set 302 is received by the computer system 100 shown in FIG. 1 for learning the multinomial logistic regression models described in FIG. 2 above. For the purposes of explanation, the image training set containing multiple images is shown by one single image 302 in the FIGS. 3A-3B. Similarly, the corresponding texton images are shown with one texton image 306, and the labeled output (i.e., scene segmented images corresponding to the images of the image training set) is represented by one labeled image 310. The image training set is pre-processed, convoluted and clustered 304 to generate texton images 306 corresponding to the images of the training set. The feature selection module 124 randomly selects multiple texture-layout features 308 (e.g., the rectangles representing the selected texture-layout features) and sends them to the RML classifier 126 to learn the multinomial logistic regression models of the RML classifier 126. In the illustration in FIG. 3A, the RML classifier has total N multinomial logistic regression models, where N is a design parameter. Each of the multinomial logistic regression models computes the probability distribution of a given texture word in a selected texture-layout feature and generates labeled output 310 of the input images 302. The labels of the output indicate the result of the scene segmentation of the input images. FIG. 3B is a corresponding illustration in color of FIG. 3A of semantic scene segmentation according to one embodiment of the invention.

RML Image Textonization

Figure 4:
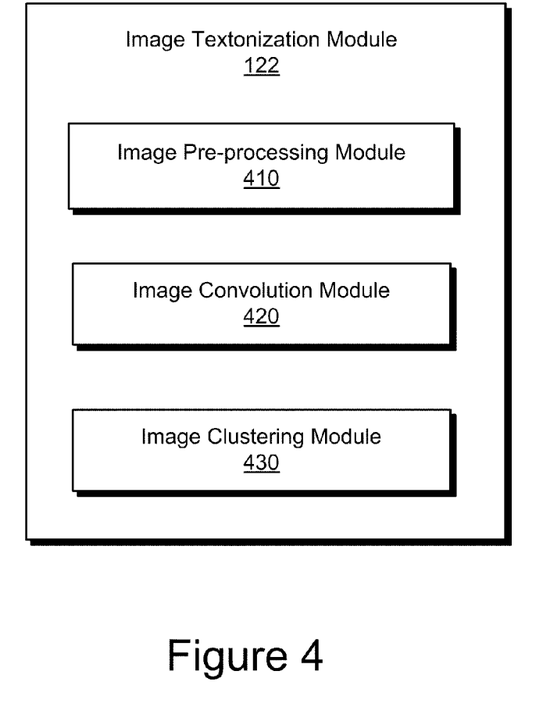
FIG. 4 is a block diagram of image textonization module according to one embodiment of the invention.

FIG. 4 is a block diagram of image textonization module 122 according to one embodiment of the invention. In the embodiment illustrated in FIG. 4, the image textonization module 122 includes an image pre-processing module 410, an image convolution module 420 and an image clustering module 430. The image textonization module 122 is configured to generate corresponding texton images from an image training set by pre-processing the image training set, convoluting and clustering the pre-processed image training set.

Generally, an image set of multiple images contains contrast and brightness variations among the images in the image training set. The contrast and brightness variations can affect the texture computation adversely. The image pre-processing module 410 is configured to remove contrast and brightness variations the image set prior to texture computation. Specifically, the image pre-processing module 410 processes the images in an image set so that the processed images are histogram equalized and have zero mean unit standard deviation.

The image convolution module 420 is configured to convolute the pre-processed image training set with a filter bank. In one embodiment, the image convolution module 420 uses a seventeen dimensional filter bank consisting of Gaussians at scales k, 2 k, and 4 k, derivatives of Gaussians along x and y axes at scales 2 k and 4 k, and Laplacians of Gaussians at scales k, 2 k, 4 k and 8 k, where k is a design parameter. The Gaussians are computed on all three channels of CIELab color space and the rest of the filters are only applied to the luminance channel.

The image clustering module 430 is configured to cluster the convoluted image training set. In one embodiment, the image clustering module 430 clusters the 17-degree vectors generated from the convoluted image set using a hierarchical k-means clustering method. Each of the 17-degree vectors of an image of the image training set after convolution is represented by an identification of the cluster (e.g., the cluster number) to which the vector belongs. A texton image is obtained in response to each pixel value of the image being replaced by its corresponding cluster identification. Each pixel of a texton image is a texton word, which is also referred to as a texture cluster. The image clustering module 430 can be further configured to use triangle inequality to accelerate k-means clustering. Other clustering methods known to those of ordinary skills in the art are readily available to the embodiments of the invention.

Random Multinomial Logit (RML) Classifier

An RML classifier consists of N multinomial logistic regression models, each of which models the probability distribution of the label y given the input vector x as in equation (1) below:

$$\pi_{il} = p_i(y = l | x, \beta_i) = \begin{cases} \exp\left(\beta_{il0} + \sum_{f=1:M} B_{ilf}\phi_f(x)\right) \Big/ Z, & l = 1:L-1 \\ 1/Z, & l = L \end{cases} \quad (1)$$

where i and l are indices into the model and label set respectively, and Z is the normalizing constant that makes the distribution sum to unity. The $\phi(.)$ represents feature functions computed on the input vector x, and $\beta_{il}$ is the vector of coefficients of length (L−1) that define the detection function for object category l. Stacking each of these vectors, we obtain the (L−1)×(M+1) matrix $\beta_i$ of all the coefficients for the multinomial regression model.

Training for the RML classifier 126 involves learning the $\beta$ coefficients from the image training set. The image training set is sampled with replacement to get N smaller sets, with which the individual regression models of the RML classifier 126 are learned. The features for the individual models are also selected randomly, M features per model, where M is usually a small number (e.g., 10 to 20). Increasing the number of features beyond this generally results in poor performance as the output variance increases with the number of features used. The final output label distribution of the RML is computed by averaging over the output of the individual models as in equation (2) below:

$$\hat{\pi}_l = \sum_{i=1:N} \pi_{il} \quad (2)$$

The coefficients $\beta$ for the individual regression models are learned in a maximum likelihood framework, which involves minimizing the error of distribution described in equation (1) over all of the training data. Considering the log-likelihood, the function to be maximized is thus (dropping the index for the model number) described in equation (3):

$$L(\beta \mid \{x, y\}) = \sum_{\{x,y\}} \log \pi_y \quad (3)$$

where $\{x, y\}$ is the image training data and $\pi_y$ is the probability distribution defined in equation (1).

The log-likelihood described in equation (3) can be optimized by gradient descent or second order methods known to those of ordinary skills in the art. For example, the gradient of equation (3) for a specific coefficient is given as:

$$\frac{\partial L}{\partial \beta_{lf}} = \sum_{\{x,y\}} \phi_f(x)(I(l = y) - \pi_{il}) \quad (4)$$

where I(.) is the indicator function which yields unity if its argument is true.

RML Texture-Layout Feature Selection

The performance of the RML classifier described through the equations (1)-(4) can be improved though texture-layout feature selection. A texture-layout feature is a selected portion of a texton image, e.g., a selected rectangle region of the texton image. RML feature selection is performed by swapping a feature currently being used in the RML classifier with a randomly selected feature based on the statistical significance of the feature currently being used, and the selected feature is used by the RML classifier to learn its multiple multinomial logistic regression models. When the features used in a multinomial logistic regression model are statistically significant, the model is improved by randomized feature selection.

In one embodiment, the feature selection module 124 uses a simple scale-independent test for determining the statistical significance of a selected feature. A feature does not contribute to the regression model described in equation (1) if the columns of the coefficients corresponding to it are all extremely small. The scale-independent test for determining the feature's contribution is to ascertain the statistical significance of the $\beta$ values by comparing them with their standard deviation. If $|\beta_{if}| \leq 2\sigma_{if}, \forall l \in [1: L-1]$, where $\sigma_{if}$ represents the corresponding standard deviations, the feature $\phi_f$ is dropped from the model and another feature is randomly selected in its place. The regression model is then re-learned with the current coefficients as initial values for the optimization. Since the discarded feature is not statistically significant, the coefficient values for the other features generally do not change significantly and the re-learning proceeds efficiently.

The standard deviation of the coefficient estimates can be computed from the Hessian of the log-likelihood function as in the equation (5) below:

$$\frac{\partial^2 L}{\partial \beta^2_{chlf}} = \sum_{\{x,y\}} -\phi_h(x)\phi_f(x)\pi_c(I(c = l) - \pi_l) \quad (5)$$

where c, l and h, f are indices into the label and feature sets respectively. The inverse of the Hessian is the covariance matrix of $\beta$, from which the standard deviations can be obtained. When all the features in a multinomial logistic regression model are statistically significant, the model is improved by randomized feature selection based on maximum likelihood. The quantity −2 log L, where L is the log-likelihood of the model, follows a chi-squared statistic and is smallest for the best-fitting model. Hence, for two models differing by a single feature, the model with the lower statistic is retained.

To further illustrate the texture-layout feature selection, the following is pseudo-code of an example of RML feature selection.

---
Algorithm 1 RML Feature Selection
---
Input: Current multinomial logistic regression model ML = {$\phi_{1:M}, \beta$},
    coefficient standard deviations $\sigma$, rounds of feature selection S
    LL $\Leftarrow$ log-likelihood of ML
    for i = 1 to S do
        B $\Leftarrow$ set of features $\phi_{lf}$ s.t. $|\beta_{lf}| \leq 2\sigma_{lf}, \forall l \in 1 : L - 1$
        if B is empty then
            Swap a randomly selected feature from current model
            for a randomly selected new feature $\phi'$
        else
            Swap a randomly selected feature from B for a
            randomly selected new feature $\phi'$
        end if
        ML' $\Leftarrow$ new model learnt using maximum likelihood
        LL' $\Leftarrow$ log-likelihood of ML'
        if LL' > LL then
            ML $\Leftarrow$ ML', LL $\Leftarrow$ LL'
        end if
    end for
    return ML

---

In one embodiment, the texture-layout features consist of a rectangle r and a texton word t. A texture word is also referred to as a texture cluster above. For every pixel p, the feature selection module 124 computes the proportion of the texton word t inside the rectangle r, where r has been translated to be in the coordinate system with p as the origin. For example, for each selected texture-layout feature, the feature selection module 124 computes a percentage of pixels inside the rectangle r whose pixel value is equal to the cluster identification of the texton word t. It can be seen that texture-layout features capture local textural context in the image, for instance the relationship that a boat is usually surrounded by water. In addition, this contextual relationship, expressed as a linear combination of multiple texture-layout feature values, is sufficient to do pixel-wise scene labeling.

To learn the RML classifier based on the texture-layout features, the feature selection module 124 first pre-selects $N_r$ rectangular regions randomly, so that the total number of possible features is $N_r \times N_t$, where $N_t$ is the number of texton words in the codebook used in the learning process. Subsequently, for each multinomial regression model in the RML classifier, a set of $M \ll N_r \times N$, features are selected randomly to create the distributions given in equation (1).

The RML is learned in a supervised manner using pixel-wise labeled data. The feature values evaluated at a pixel along with its label constitute a training instance. Randomly selected subsets of this training data are used to learn the individual regression models. During runtime, the features in the regression models are evaluated on an input image and passed through the regression models to get the output labeling as in equation (2).

Figure 5A:
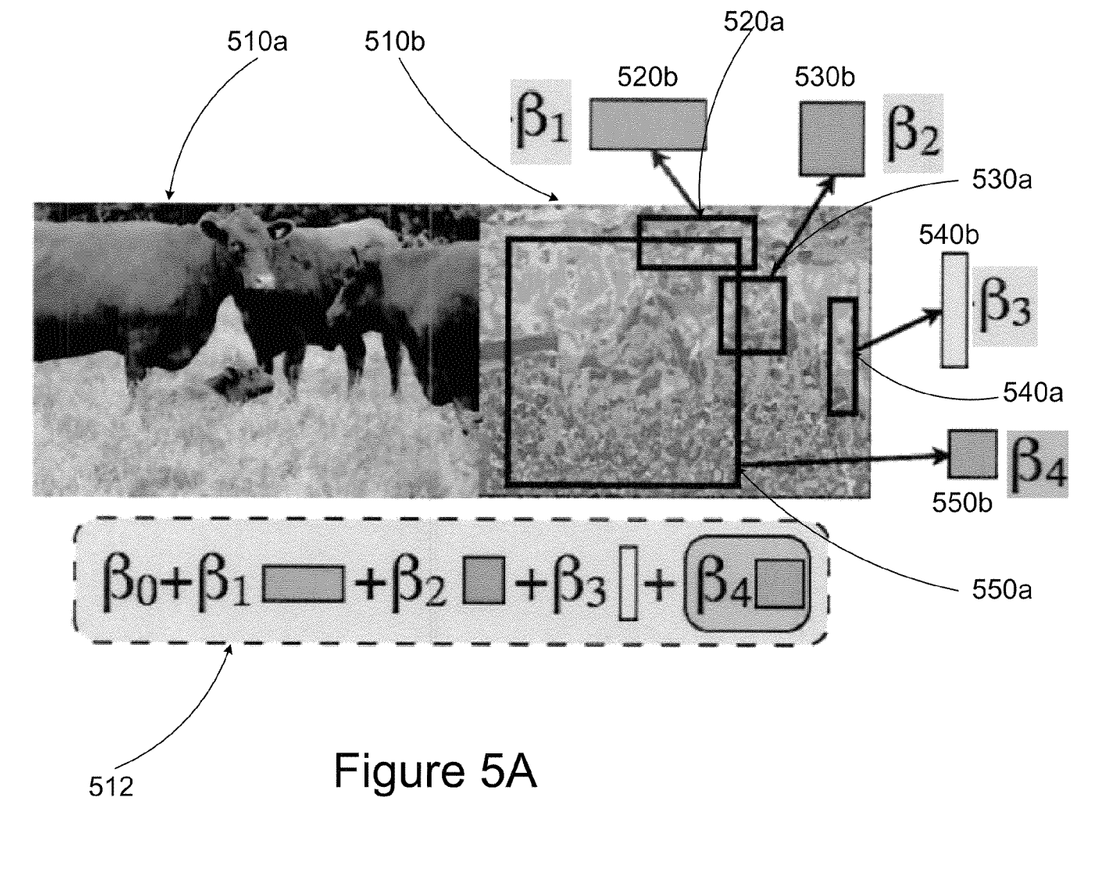
FIG. 5A is an illustration in black and white of feature selection according to one embodiment of the invention.

Referring now to FIG. 5A, FIG. 5A is an illustration in black and white of feature selection according to one embodiment of the invention. Image 510a is one of the images of an image training set used in the RML classifier learning process, and image 510b is the corresponding texton image of image 510a. The coefficients β 512 defined in equation (1) for the individual regression models of the RML classifier are learned in a maximum likelihood framework. In the example illustrated in FIG. 5A, total four texture-layout features (520a, 530a, 540a and 550a) are randomly selected. Each selected texture-layout feature consists of a rectangular shape, which is a portion of the texton image 510b, and a texton word (e.g., 520b, 530b, 540b, and 550b). For each selected texture-layout feature, the feature selection module 124 computes a percentage of pixels inside the rectangle of the texture-layout feature, whose pixel value is equal to the value of the texton word associated with the selected feature. If the texton word is represented by the cluster identification after textonization, the feature selection module 124 computes a ratio of the number of pixels in the rectangle of a selected feature whose pixel value equals the cluster identification and the total number of pixels inside the rectangle.

Figure 5B:
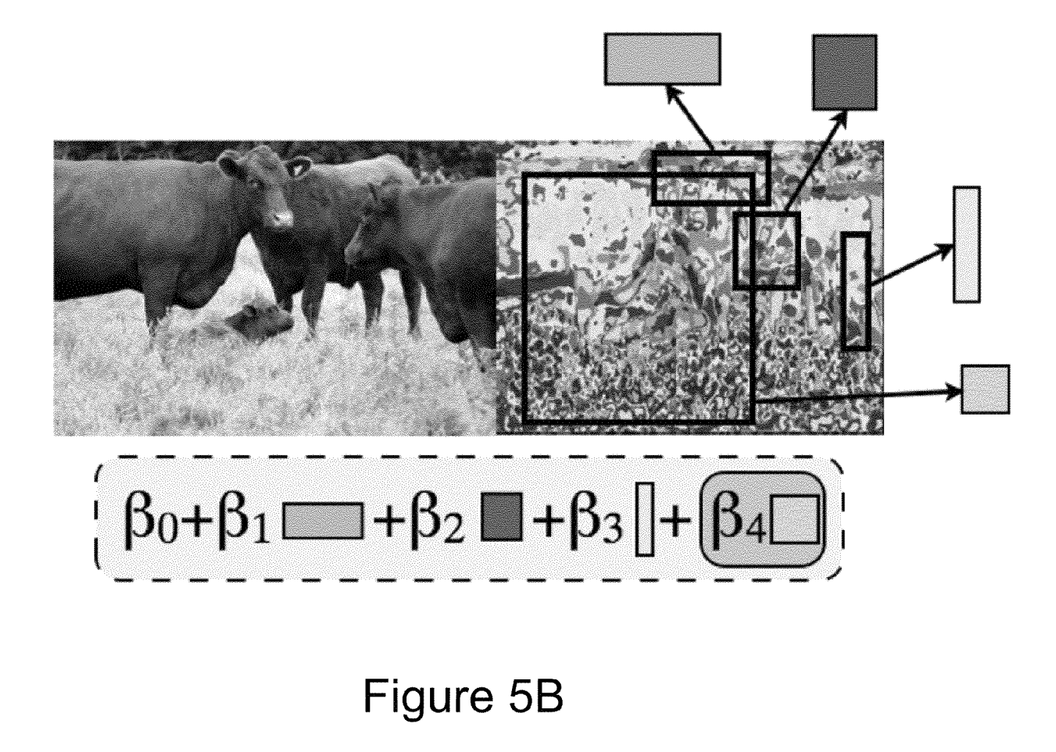
FIG. 5B a corresponding illustration in color of FIG. 5A of feature selection according to one embodiment of the invention.

FIG. 5B a corresponding illustration in color of FIG. 5A of feature selection according to one embodiment of the invention. Each colored rectangle represents a texture-layout feature via the rectangle window and the texton word (denoted by the color for illustration) associated with the texture-layout feature. Features are statistically insignificant for labeling pixels in a scene when their values are not indicative of the pixel label. A texture-layout feature that is statistically insignificant may be because the shape of the feature is too large or too small. Using FIG. 5B as an example, the $4^{th}$ feature for coefficient $\beta_4$ in the multinomial regression model being learned is statistically insignificant and is discarded through the feature selection.

RML Classifier Application for Scene Segmentation

Figure 6:
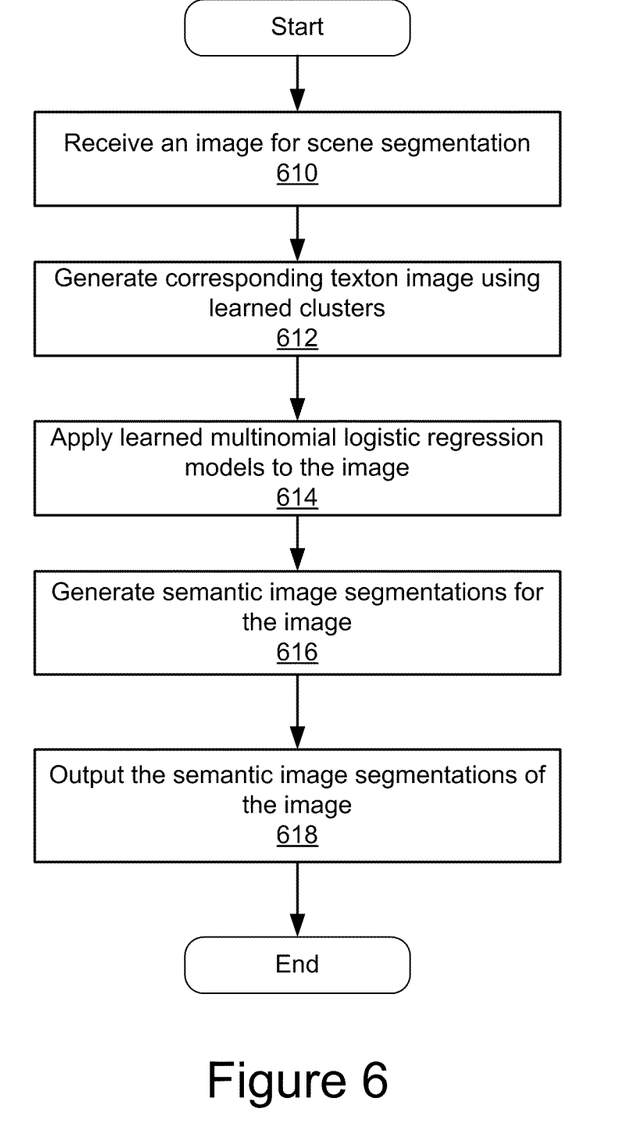
FIG. 6 is a flowchart of applying learned multinomial logistic regression models for semantic scene segmentation of an input image according to one embodiment of the invention.

The learned RML classifier 126 described above can be used to texture-based scene segmentation with improved accuracy and performance efficiency comparing with conventional scene segmentation methods. FIG. 6 is a flowchart of applying the learned RML classifier 126 to an input image for semantic scene segmentation according to one embodiment of the invention. Initially, the computer system 100 having a learned RML classifier 126 receives 610 an input image for scene segmentation. The image textonization module 122 generates 612 a corresponding texton image using the clusters learned during RML classifier learning process. The RML classifier 126 applies 614 the learned multinomial logistic regression models to the input image. For example, the RML classifier 126 computes the probability distribution of a pixel label modeled by each multinomial logistic regression model of the RML classifier 126 using equation (1). The RML classifier 126 generates 616 the semantic image segmentations for the input image, where semantic image segmentation is represented by segmentation label. For example, the RML classifier 126 computes the final output label distribution of the input image by averaging over the output of the individual multinomial logistic regression models of the RML classifier 126 using the equation (2). Finally, the computer system 100 outputs 618 the semantic image segmentation of the image.

To classify street scenes for use in intelligent transportation systems and other applications, a RML classifier is learned via an image training set with pre-labeled images. The RML classifier consists of multiple multinomial logistic regression models. Each of the multinomial logistic regression models operates on a randomly selected subset of features from the image training set and outputs a probability distribution on the label of the pixel corresponding to the selected features. The use of a maximum likelihood framework allows the multinomial logistic regression to operate in large feature spaces with improved performance. The learned RML classifier can be efficiently used to an input image for scene segmentation. The disclosed RML-based scene segmentation system has a wide range application to real world problems, such as applications in robotics and automotive systems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer implemented method for learning a random multinomial logit (RML) classifier for scene segmentation, the method comprising:

receiving an image training set, wherein the image training set comprises multiple digital representations of images, and an object of an image of the image training set has a semantic label;

generating a plurality of texton images corresponding to the images in the image training set, wherein a texton image of its corresponding image in the image training set is an image of pixels, and wherein each pixel value in a texton image is replaced by a representation of the pixel value of its corresponding image in the image training set;

selecting one or more texture-layout features from the plurality of the texton images, wherein selecting one or more texture-layout features comprises swapping a feature currently being used by the RML classifier with a randomly selected new feature based on the statistical significance of the feature currently being used;

learning multiple multinomial logistic regression models of the RML classifier based on the selected texture-layout features; and evaluating the performance of the multiple multinomial logistic regression models based on the semantic labels of the objects in the image training set.

2. The method of claim 1, wherein generating the plurality of texton images corresponding to the images in the image training set comprises:
removing contrast and brightness variations among the images in the image training set;
convoluting the images in the image training set with a filter bank to generate convoluted images; and
clustering the convoluted images.

3. The method of claim 2, wherein the filter bank is a seventeen-degree filter bank consisting of Gaussians at different scales, derivatives of Gaussians at different scales and Laplacians of Gaussians at different scales.

4. The method of claim 2, wherein clustering the convoluted images comprises clustering the convoluted images using a hierarchical k-means clustering method.

5. The method of claim 4, wherein each of the seventeen-degree vectors of a convoluted image is represented by an identification of the cluster to which the vector belongs.

6. The method of claim 1, wherein the statistical significance of a feature is determined by a comparison of the coefficients values associated with the feature and standard deviation of the coefficients values.

7. The method of claim 1, wherein a selected texture-layout feature from a texton image comprises a rectangle area of the texton image and a texton word.

8. The method of claim 7 further comprises computing a percentage of pixels inside the rectangle area whose pixel value is equal to the value of the texton word over the total number of pixels inside the rectangle area.

9. The method of claim 8, wherein the value of the texton word is equal to the cluster identification of the texton word.

10. The method of claim 1, wherein learning multiple multinomial logistic regression models of the RML classifier comprises:
for each multinomial logistic regression models of the RML classifier:
estimating the probability distribution of a texton word of a selected texture-layout feature;
minimizing the error of the estimated probability distribution of the texton word; and
optimizing the estimated probability distribution of the texton word.

11. The method of claim 10, wherein learning multiple multinomial logistic regression models of the RML classifier further comprises averaging the probability distribution of the texton word from each of the multiple multinomial logistic regression models to generate a final output label for the texton word.

12. The method of claim 1 further comprises re-learning a multinomial logistic regression model of the RML classifier responsive to the performance of the multinomial logistic regression model being below a performance threshold.

13. The method of claim 1 further comprises applying the RML classifier to an input image for scene segmentation.

14. A computer system for method for learning a random multinomial logit (RML) classifier for scene segmentation, the system comprising:
an image textonization module configured to:
receive an image training set, wherein the image training set comprises multiple digital representations of images, and an object of an image of the image training set has a semantic label; and
generate a plurality of texton images corresponding to the images in the image training set, wherein a texton image of its corresponding image in the image training set is an image of pixels, and wherein each pixel value in a texton image is replaced by a representation of the pixel value of its corresponding image in the image training set;
a feature selection module configured to select one or more texture-layout features from the plurality of the texton images, wherein selecting one or more texture-layout features comprises swapping a feature currently being used by the RML classifier with a randomly selected new feature based on the statistical significance of the feature currently being used; and
a RML classifier configured to:
learn multiple multinomial logistic regression models of the RML classifier based on the selected texture-layout features; and
evaluate the performance of the multiple multinomial logistic regression models based on the semantic labels of the objects in the image training set.

15. The system of claim 14, wherein the image textonization module is further configured to:
remove contrast and brightness variations among the images in the image training set;
convolute the image training set with a filter bank to generate convoluted images; and
cluster the convoluted images.

16. The system of claim 15, wherein the filter bank is a seventeen-degree filter bank consisting of Gaussians at different scales, derivatives of Gaussians at different scales and Laplacians of Gaussians at different scales.

17. The system of claim 16, wherein each of the seventeen-degree vectors of a convoluted image is represented by an identification of the cluster to which the vector belongs.

18. The system of claim 14, wherein a selected texture-layout feature from a texton image comprises a rectangle area of the texton image and a texton word.

19. The system of claim 18, wherein the feature selection module is further configured to compute a percentage of pixels inside the rectangle area whose pixel value is equal to the value of the texton word over the total number of pixels inside the rectangle area.

20. The system of claim 14, wherein the RML classifier is further configured to:
configure each multinomial logistic regression models of the RML classifier to:
estimate the probability distribution of a texton word of a selected texture-layout feature;
minimize the error of the estimated probability distribution of the texton word; and
optimize the estimated probability distribution of the texton word.

21. The system of claim 20, wherein the RML classifier is further configured to average the probability distribution of the texton word from each of the multiple multinomial logistic regression models to generate a final output label for the texton word.

22. The system of claim 14, wherein the RML classifier is further configured to re-learn a multinomial logistic regression model of the RML classifier responsive to the performance of the multinomial logistic regression model being below a performance threshold.

23. The system of claim 14, wherein the RML classifier is further configured to apply the RML classifier to an input image for scene segmentation.

24. A computer program product for learning a random multinomial logit (RML) classifier for scene segmentation, the computer program product comprising a non-transitory computer-readable medium containing computer program code for performing the operations:

receiving an image training set, wherein the image training set comprises multiple digital representations of images, and an object of an image of the image training set has a semantic label;

generating a plurality of texton images corresponding to the images in the image training set, wherein a texton image of its corresponding image in the image training set is an image of pixels, and wherein each pixel value in a texton image is replaced by a representation of the pixel value of its corresponding image in the image training set;

selecting one or more texture-layout features from the plurality of the texton images, wherein selecting one or more texture-layout features comprises swapping a feature currently being used by the RML classifier with a randomly selected new feature based on the statistical significance of the feature currently being used;

learning multiple multinomial logistic regression models of the RML classifier based on the selected texture-layout features; and evaluating the performance of the multiple multinomial logistic regression models based on the semantic labels of the objects in the image training set.

25. The computer program product of claim 24, wherein the computer program code for learning multiple multinomial logistic regression models of the RML classifier comprises computer program code for:

each multinomial logistic regression models of the RML classifier:

estimating the probability distribution of a texton word of a selected texture-layout feature;

minimizing the error of the estimated probability distribution of the texton word; and optimizing the estimated probability distribution of the texton word.

26. The computer program product of claim 24 further comprises computer program code for applying the RML classifier to an input image for scene segmentation.

\* \* \* \* \*